US011255676B2

(12) United States Patent
    Steinhardt et al.

(10) Patent No.: US 11,255,676 B2
(45) Date of Patent: Feb. 22, 2022

(54) SENSOR SYSTEM FOR INDEPENDENTLY EVALUATING THE INTEGRITY OF THE DATA OF THE SENSOR SYSTEM

(71) Applicant: Continental Teves AG & Co. OHG, Frankfurt (DE)

(72) Inventors: Nico Steinhardt, Frankfurt (DE); Hermann Winner, Bietigheim (DE)

(73) Assignee: CONTINENTAL TEVES AG & CO. OGH, Frankfurt (DE)

( * ) Notice: Subject to any disclaimer, the term of this patent is extended or adjusted under 35 U.S.C. 154(b) by 768 days.

(21) Appl. No.: 14/353,850

(22) PCT Filed: Oct. 24, 2012

(86) PCT No.: PCT/EP2012/071092
    § 371 (c)(1),
    (2) Date: Apr. 24, 2014

(87) PCT Pub. No.: WO2013/060750
    PCT Pub. Date: May 2, 2013

(65) Prior Publication Data
    US 2014/0336983 A1    Nov. 13, 2014

(30) Foreign Application Priority Data

Oct. 24, 2011  (DE) ..................... 10 2011 085 134.8
Nov. 21, 2011  (DE) ..................... 10 2011 086 710.4
May 2, 2012    (DE) ..................... 10 2012 207 297.7

(51) Int. Cl.
    *G01C 21/16*    (2006.01)
    *G06F 17/18*    (2006.01)
    (Continued)

(52) U.S. Cl.
    CPC ............. *G01C 21/165* (2013.01); *A01C 1/00* (2013.01); *G01C 21/16* (2013.01); *G01D 1/00* (2013.01);
    (Continued)

(58) Field of Classification Search
    None
    See application file for complete search history.

(56) References Cited

U.S. PATENT DOCUMENTS 5,451,960 A * 9/1995 Kastella ................ G01S 13/726
                                                       342/195
5,482,314 A * 1/1996 Corrado ............... G06K 9/6293
                                                       280/735
(Continued)

FOREIGN PATENT DOCUMENTS

DE   10 2006 029 148 A1   1/2008
DE   10 2010 063 984 A1   8/2011
(Continued)

OTHER PUBLICATIONS

STIC EIC 2800 Search Report (Year: 2019).*
(Continued)

Primary Examiner — Catherine T. Rastovski
Assistant Examiner — Leonard S Liang
(74) Attorney, Agent, or Firm — Dickinson Wright PLLC

(57) ABSTRACT

A sensor system, having sensor elements for sensing at least to some extent different primary measured variables or use different measurement principles. A signal processing device evaluates the sensor signals from the sensor elements at least to some extent collectively and rates the information quality of the sensor signals. The signal processing device further provides a piece of information about the consistency of at least one datum of a physical variable, wherein this datum of the physical variable is calculated, at least to some extent, (Continued)

on the basis of the sensor signals from sensor elements that sense this physical variable directly or from the sensor signals from which it is possible to calculate this physical variable. The information about the consistency of this datum of this physical variable is calculated at least on the basis of the directly or indirectly redundantly present sensor information.

12 Claims, 2 Drawing Sheets

(51) Int. Cl.
  *A01C 1/00* (2006.01)
  *G01S 19/49* (2010.01)
  *G01D 1/00* (2006.01)
  *G01S 19/47* (2010.01)

(52) U.S. Cl.
  CPC ............... *G01S 19/49* (2013.01); *G06F 17/18* (2013.01); *G01S 19/47* (2013.01)

(56) References Cited

U.S. PATENT DOCUMENTS

| | | | | |
|---|---|---|---|---|
| 5,626,140 A * | 5/1997 | Feldman | ............... | G06K 9/6293 600/483 |
| 5,838,561 A * | 11/1998 | Owen | ............... | G05B 23/024 700/32 |
| 5,902,351 A * | 5/1999 | Streit | ............... | G01C 21/28 340/990 |
| 6,026,340 A * | 2/2000 | Corrado | ............... | B60N 2/002 280/735 |
| 6,240,367 B1 * | 5/2001 | Lin | ............... | G01C 21/28 342/357.31 |
| 6,829,568 B2 * | 12/2004 | Julier | ............... | G06F 17/18 702/189 |
| 7,158,866 B2 * | 1/2007 | Gustafsson | ............... | B60C 23/061 701/1 |
| 7,376,499 B2 | 5/2008 | Salman et al. | | |
| 8,065,104 B2 * | 11/2011 | Fiedler | ............... | G01C 21/16 702/95 |
| 8,131,463 B2 * | 3/2012 | Lopez | ............... | G01S 19/08 701/469 |
| 8,417,490 B1 * | 4/2013 | Preston | ............... | G06F 17/5095 701/114 |
| 10,495,483 B2 * | 12/2019 | Steinhardt | ............... | G01C 21/20 |
| 2003/0130791 A1 * | 7/2003 | McIntyre | ............... | G05D 1/0077 701/472 |
| 2003/0171855 A1 * | 9/2003 | Li | ............... | B64G 1/28 701/4 |
| 2003/0186663 A1 * | 10/2003 | Chen | ............... | G06K 9/3241 455/226.3 |
| 2004/0073360 A1 * | 4/2004 | Foxlin | ............... | G01C 21/16 701/517 |
| 2004/0102900 A1 | 5/2004 | Ibrahim et al. | | |
| 2008/0114544 A1 * | 5/2008 | Liu | ............... | G01C 21/165 701/480 |
| 2008/0157980 A1 * | 7/2008 | Sachanandani | ............... | A61B 5/0031 340/573.1 |
| 2009/0043447 A1 * | 2/2009 | Vershinin | ............... | G05B 9/02 701/29.2 |
| 2010/0004856 A1 * | 1/2010 | Kobori | ............... | G08G 1/09623 701/532 |
| 2010/0019963 A1 | 1/2010 | Gao et al. | | |
| 2011/0118979 A1 * | 5/2011 | Mao | ............... | G01C 21/005 701/532 |
| 2011/0190972 A1 * | 8/2011 | Timmons | ............... | G08G 1/166 701/31.4 |
| 2011/0257901 A1 * | 10/2011 | Bechhoefer | ............... | G01H 1/00 702/34 |
| 2011/0257927 A1 * | 10/2011 | Bharadwaj | ............... | G01C 21/165 702/150 |
| 2011/0291887 A1 * | 12/2011 | Pulford | ............... | G01S 19/20 342/357.58 |
| 2012/0221273 A1 * | 8/2012 | Furukawa | ............... | G01S 13/726 702/94 |
| 2013/0132784 A1 * | 5/2013 | Patino-Studencka | .... | G01K 7/42 714/704 |
| 2014/0222394 A1 * | 8/2014 | Drees | ............... | G06Q 10/0635 703/2 |
| 2014/0371990 A1 * | 12/2014 | Steinhardt | ............... | G06K 9/00503 701/41 |

FOREIGN PATENT DOCUMENTS

| | | | | |
|---|---|---|---|---|
| EP | 0 498 655 A2 | 8/1992 | | |
| EP | 2 128 645 A1 | 12/2009 | | |
| WO | WO 95/34850 | 12/1995 | | |
| WO | WO-9741494 A1 * | 11/1997 | ............ | G05B 23/024 |
| WO | WO 2012050473 A1 * | 4/2012 | ............ | G05B 9/03 |
| WO | WO-2012050473 A1 * | 4/2012 | ............ | G05B 9/03 |

OTHER PUBLICATIONS

PCT International Search Report—dated Jan. 15, 2013.
German Examination Report—dated Mar. 21, 2014.
Stochastic Models, Estimation, and Control—P. Maybeck 1979.
An Introduction to the Kalman Filter—Welch & Bishop—Jul. 24, 2006.
Novel Approaches to Adaptive Estimation of Kalman Filter—Yanrui Geng.

* cited by examiner

SENSOR SYSTEM FOR INDEPENDENTLY EVALUATING THE INTEGRITY OF THE DATA OF THE SENSOR SYSTEM

CROSS REFERENCE TO RELATED APPLICATIONS

This application claims priority to German Patent Application Nos. 10 2011 085 134.8, filed Oct. 24, 2011; 10 2011 086 710.4, filed Nov. 21, 2011; 10 2012 207 297.7, filed May 2, 2012; and PCT/EP2012/071092, filed Oct. 24, 2012.

FIELD OF THE INVENTION

The invention relates to a sensor system having a plurality of sensor elements that are and perform such of the fence at least to some extent different primary measured variables and/or use of at least to some extent different measurement principles and to the use thereof in motor vehicles, particularly in automobiles.

BACKGROUND

Laid-open specification DE 10 2010 063 984 A1 describes a sensor system, including a plurality of sensor elements and a signal processing device, wherein the signal processing device is designed such that the output signals from the sensor elements are evaluated collectively.

SUMMARY

The invention is based on the object of proposing a sensor system that affords or allows a relatively high level of inherent safety with regard to its signal processing and/or that is suitable for safety-critical or safety-critical use.

This object is achieved by the sensor system described herein.

INTRODUCTORY DESCRIPTION OF THE INVENTION

The term datum is expediently understood to mean the singular of the term data.

A primary measured variable is preferably understood to mean the measured variable that the sensor element is primarily designed to sense and that is sensed directly, in particular.

The wording "directly or indirectly redundantly present sensor information" preferably means sensor information that is present through parallel redundancy, as direct redundancy, or through analytical redundancy, as indirect redundancy.

The signal processing device preferably includes an integrity unit in which the information about the consistency is produced.

It is preferred that the signal processing device has a fusion filter that provides a defined fusion data record in the course of the collective evaluation of at least the sensor signals and/or signals derived therefrom from the sensor elements, wherein this fusion data record has in each case data for defined physical variables, wherein the fusion data record includes, for at least one physical variable, a datum of this physical variable and a piece of information about the consistency of this datum of the physical variable.

It is expedient that the signal processing device is in a form such that the defined fusion data record additionally has at least one status datum of a sensor element, which the sensor element provides itself by means of self-diagnosis, wherein this status datum is taken into account during the calculation of the information about the consistency of at least one datum of a physical variable.

The signal processing device is preferably in a form such that it provides a relative confidence measure as relative confidence information, which is dependent on the relative deviation in the data and/or measured values from at least two sensor information source channels on the basis of which the relevant at least one datum of the physical variable is calculated, as information about the consistency for at least one datum of a physical variable.

It is expedient that the signal processing device is in a form such that it uses a measured value and/or a piece of measurement information and/or a value derived from a piece of measurement information and also an uncertainty measure for this sensor information source channel, respectively, per sensor information source channel in order to calculate the relative confidence information.

The signal processing device is particularly in a form such that for the at least one datum of a physical variable the associated relative confidence information is calculated as the relative confidence measure $K_r$ with $$K_r = \frac{\int_{-\infty}^{+\infty} \prod_{i=1}^{i=n} p_i(x, \mu_i, \sigma_i) \cdot dx}{\int_{-\infty}^{+\infty} \prod_{i=1}^{i=n} p_i(x, 0, \sigma_i) \cdot dx},$$

where $0 \leq K_r \leq 1$ and where n is defined or definable as the number of compared sensor information source channels, $p_i$ is defined or definable as the probability density function of the i-th sensor information source channel, and in this case particularly $\mu_i$ is defined or definable as the mean value of the probability distribution and $\sigma_i$ is defined or definable as the standard deviation of the probability distribution.

It is preferred that the signal processing device is in a form such that, in addition or as an alternative to a relative confidence measure, it provides an absolute confidence measure as absolute confidence information, which is dependent on an uncertainty measure for at least two sensor information source channels on the basis of which the relevant at least one datum of the physical variable is calculated, as information about the consistency for at least one datum of a physical variable.

In particular, the signal processing device is in a form such that for the at least one datum of a physical variable the associated absolute confidence information is calculated as the absolute confidence measure $K_a$ with $$K_a = [\Sigma_{i=1}^{i=n} \sigma_i^{-2}]^{-1/2} \text{ or } K_a = \sqrt{\Sigma_{i=1}^{i=n} \sigma_i^2} \text{ and in this case with}$$

n as the number of compared sensor information source channels and $\sigma_i$ as the standard deviation or variance of the i-th sensor information source channel.

It is expedient that the signal processing device is in a form such that for at least one datum of a physical variable a rating is performed to determine whether or not the consistency is sufficiently great, wherein this rating is performed by calculating whether the relative confidence information and/or the relative confidence measure exceeds a defined threshold value.

It is preferred that a disappearance of a sensor information source channel is taken into account during the calculation of the information about the consistency. In particular, the signal processing device is in this case in a form such that in the event of only a single sensor information source channel being available and/or only a single sensor information channel providing a datum in a defined time interval in which the data from at least one sensor information source channel are used for calculating the information about the consistency, no relative confidence measure is calculated and that in this case the value 0 or a value close to infinity or a defined value is assumed for the absolute confidence measure or that the absolute confidence measure is not calculated in this case.

An uncertainty measure is preferably understood to mean a variation measure and/or a variation and/or a variance and/or an accuracy or an accuracy measure that can be calculated or converted from the uncertainty measure.

Preferably, the uncertainty measure is dependent on or follows a probability density function or a standard deviation or a variance. In this case, the probability density function is, in particular, dependent on the mean value of the probability distribution and the standard deviation of the probability distribution.

Preferably, the sensor system uses the information about the consistency for a system test or validation, which involves using threshold values for the consistency to establish whether or not the sensor system operates in a sufficiently error-free manner.

As an alternative preference, the sensor system uses the information about the consistency for monitoring the operation of the sensor system.

For the purpose of rating and/or calculating the relative confidence or the relative confidence measure, the match between the measures and the uncertainties thereof are preferably weighted against one another. This results in the demands or constraints on the match extent or relative confidence measure $K_r$, which are described or defined as follows, in particular:

extreme values: 0 for complete divergence, 1 for complete match between the measured values.

independence of the number of compared measured values and the absolute stochastic uncertainty thereof.

higher relative weighting of measured values with low uncertainty.

independence of the absolute measured values/operating points, dependence on the differences among the measurements.

independence of the type of distribution function (e.g. normal distribution, even distribution).

These expedient criteria are satisfied by weighting of the associated probability densities with one another by multiplication and integration of the result function. The associated densities are known from the specifications of the measurement data, for example. The relative confidence or the relative confidence measure is particularly preferably evaluated and/or calculated measurement era by measurement era by placing the probability densities around the measured values $\mu_i$ and multiplying said probability densities by one another on a point-by-point basis. Normalization of the coverage measure $K_r$ is achieved by the division by the result of the same calculation with values that are assumed to have ideal coverage. This involves the differences for $\mu_i=0$ being set:

$$K_r = \frac{\int_{-\infty}^{+\infty} \prod_{i=1}^{i=n} p_i(x, \mu_i, \sigma_i) \cdot dx}{\int_{-\infty}^{+\infty} \prod_{i=1}^{i=n} p_i(x, 0, \sigma_i) \cdot dx} \text{ with } 0 \leq K_r \leq 1.$$

In this case, preferably, n is defined or definable as the number of compared sensor information source channels, $p_i$ is defined or definable as the probability density function of the i-th sensor information source channel, and in this case particularly $\mu_i$ is defined or definable as the mean value of the probability distribution and $\sigma_i$ is defined or definable as the standard deviation of the probability distribution.

In order to rate the variation measure, the spreads of the available signals are preferably set off against one another in order to obtain an absolute measure of the maximum acuteness of the confidence check that can be achieved for the available sensor set, particularly as an absolute confidence measure. This preferably results in the demands on the variation measure $K_a$:

dependence on the number of available signals—each added data source improves the rating.

signals with high uncertainty contribute little and signals with low uncertainty contribute a large amount to the improvement.

indication of the best possible confidence level, independence of the actual coverage of the probability densities.

independence of operating point and measured values.

It is preferred that the signal processing device has a fusion filter that provides a defined fusion data record in the course of the collective evaluation of at least the sensor signals and/or signals derived therefrom from the sensor elements, wherein this fusion data record has in each case data for defined physical variables, wherein the fusion data record includes, for at least one physical variable, a value of this physical variable and a piece of information about the data quality thereof.

Measurement data are expediently understood to mean the output signals or data from the sensor elements or sensor information source channels.

The fusion filter is preferably in the form of a Kalman filter, as an alternative preference in the form of a particle filter, or alternatively in the form of an information filter or alternatively in the form of an "Unscented" Kalman filter.

It is preferred that the fusion filter is in a form such that the fusion data record includes a relative value, particularly an offset value and/or change value and/or correction value and/or error value, as the value of the at least one physical variable.

It is expedient that the relative values of the respective physical variables of the fusion data record are correction values that each have an associated piece of variation information or a variation or variation measure, in particular a variance, as information about the data quality thereof.

It is preferred that the fusion filter is in a form such that the value of at least one physical variable of the fusion data record is calculated on the direct or indirect basis of sensor signals from a plurality of sensor elements, wherein these sensor elements sense this at least one physical variable redundantly in a direct or indirect manner. This redundant sensing is particularly preferably implemented as direct or parallel redundancy and/or implemented as analytical redundancy, from computationally derived or deduced variables/values and/or model assumptions.

The fusion filter is preferably in the form of a Kalman filter that iteratively carries out at least prediction steps and correction steps and at least to some extent provides the fusion data record. In particular, the fusion filter is in the form of an error state space extended sequential Kalman filter, that is to say in the form of a Kalman filter, that particularly preferably includes a linearization and in which error state information is calculated and/or estimated and/or that operates sequentially and in this case uses/takes into account the input data available in the respective function step of the sequence.

It is expedient that the sensor system has an inertial sensor arrangement, includes at least one acceleration sensor element and at least one rate of rotation sensor element, and that the sensor system comprises a strapdown algorithm unit, in which a strapdown algorithm is carried out, by means of which at least the sensor signals from the inertial sensor arrangement are processed to form, in particular corrected, navigation data and/or driving dynamics data, based on the vehicle in which the sensor system is arranged.

It is particularly preferred that the strapdown algorithm unit provides its calculated navigation data and/or driving dynamics data for the fusion filter directly or indirectly.

The sensor system preferably has an inertial sensor arrangement that is in a form such that it can sense at least the acceleration along a second defined axis, particularly the transverse axis of the vehicle, and at least the rate of rotation about a third defined axis, particularly the vertical axis of the vehicle, wherein the first and third defined axes form a generating system, and in this case are oriented in particular perpendicularly with respect to one another, wherein the sensor system furthermore has at least one wheel speed sensor element, particularly at least or precisely four wheel speed sensor elements, which sense the wheel speed of a wheel or the wheel speeds of a respective one of the wheels of the vehicle and in particular additionally sense the direction of rotation of the associated wheel of the vehicle in which the sensor system is arranged, wherein the sensor system additionally includes at least one steering angle sensor element that senses the steering angle of the vehicle, and wherein the sensor system furthermore includes a satellite navigation system that is particularly in a form such that it senses and/or provides the distance data in each case between the associated satellite and the vehicle or a variable that is dependent thereon and also speed information data in each case between the associated satellite and the vehicle or a variable that is dependent thereon.

With particular preference, the inertial sensor arrangement is in a form such that it can sense at least the accelerations along a first, a second and a third defined axis, and at least the rates of rotation about this first, about this second and about this third defined axis, wherein said first, second and third defined axes form a generating system, and in this case are oriented particularly in each case perpendicularly with respect to one another.

It is preferred that the inertial sensor arrangement provides its sensor signals for the strapdown algorithm unit, and the strapdown algorithm unit is in a form such that it calculates and/or provides at least from the sensor signals from the inertial sensor arrangement and also particularly from at least one piece of error state information and/or variance and/or piece of information about the data quality that is associated with a sensor signal or with a physical variable and is provided by the fusion filter, as measurement variables and/or navigation data and/or driving dynamics data, at least corrected accelerations along the first, second and third defined axes, at least corrected rates of rotation about these three defined axes, at least one speed with respect to these three defined axes, and at least one position variable.

It is expedient that the sensor system is in a form such that in each case at least one sensor signal and/or a physical variable as a direct or derived variable of the inertial sensor arrangement and/or of the strapdown algorithm unit, of the wheel speed sensor elements and of the steering angle sensor element, in particular indirectly via a vehicle model unit, and also of the satellite navigation system, in this case in particular distance data in each case between the associated satellite and the vehicle or a variable that is dependent thereon and also speed information data in each case between the associated satellite and the vehicle or a variable that is dependent thereon, are provided for the fusion filter and taken into account by the fusion filter during the calculations thereof.

It is particularly preferred that the vehicle model unit is in a form such that, from the sensor signals from the wheel speed sensor elements and from the steering angle sensor element, the speed along the first defined axis, the speed along the second defined axis and the rate of rotation about the third defined axis are calculated.

It is quite particularly preferred that the vehicle model unit is in a form such that it uses for calculation a least square error method for solving an overdetermined system of equations, known in particular as a least squared error method.

It is expedient that the vehicle model unit is in a form such that it takes into account at least the following physical variables and/or parameters during its calculation:

a) the steering angle of each wheel, sensed in particular by the steering angle sensor for the two front wheels, wherein the model assumption is made that the steering angle of the rear wheels is equal to zero or that the steering angle of the rear wheels is additionally sensed,
b) the wheel speed or a variable that is dependent thereon for each wheel,
c) the direction of rotation of each wheel,
d) the dynamic radius and/or wheel diameter of each wheel, and
e) the track width of each axle of the vehicle and/or the wheel base between the axles of the vehicle.

The signal processing device is preferably in a form such that the fusion filter calculates and/or provides and/or outputs the fusion data record at defined instants.

The fusion filter is preferably in a form such that it calculates and/or provides and/or outputs the fusion data record independently of the sampling rates and/or sensor signal output instants of the sensor elements, particularly of the wheel speed sensor elements and the steering angle sensor element, and independently of temporal signal or measured variable or information output instants of the satellite navigation system.

It is expedient that the signal processing device is in a form such that in the course of a function step of the fusion filter always, in particular asynchronously, the newest—available to the fusion filter—information and/or signals and/or data from the sensor elements, particularly from the wheel speed sensor elements and the steering angle sensor element, directly or indirectly, particularly by means of the vehicle model unit, and from the satellite navigation system directly or indirectly, are sequentially updated and/or included in the fusion filter and are taken into account during the calculation of the associated function step of the fusion filter.

Furthermore, the invention relates to the use of the sensor system in vehicles, particularly motor vehicles, particularly preferably in automobiles.

In addition, the invention relates particularly to a method that is executed or carried out in the sensor system and is disclosed by the above embodiment options/possibilities of the sensor system for the possible method variants.

BRIEF DESCRIPTION OF THE DRAWINGS

Further preferred embodiments are evident from the subclaims and the description below of an exemplary embodiment with reference to FIG. 1. Furthermore.

FURTHER DESCRIPTION OF THE INVENTION

Figure 1:
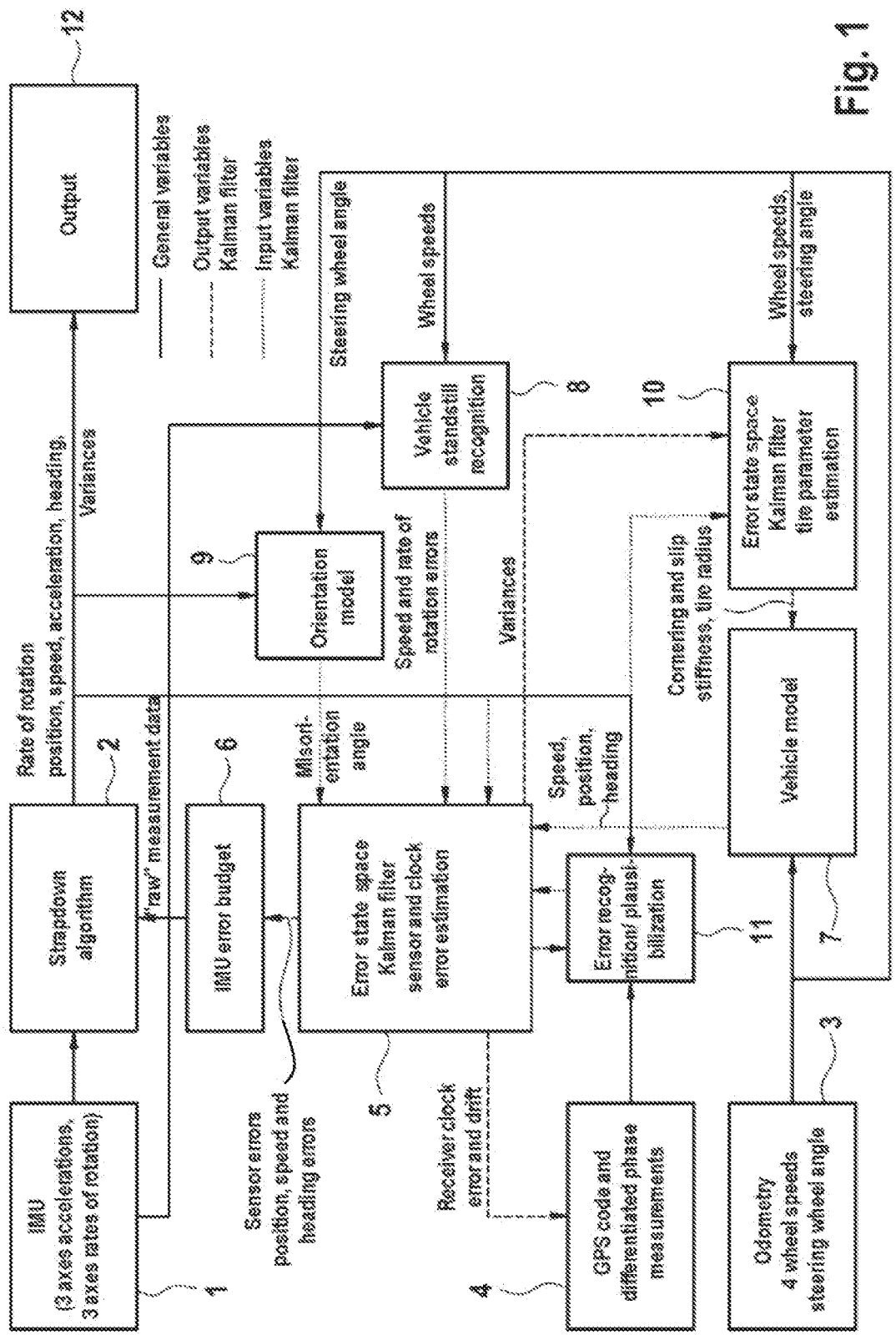

FIG. 1 shows a schematic illustration of an exemplary embodiment of the sensor system that is provided for arrangement and use in a vehicle. In this case, the sensor elements and the satellite navigation system and also the most important signal processing units of the signal processing device are illustrated as function blocks, as is their interaction among one another.

The sensor system comprises an inertial sensor arrangement 1, IMU, "inertial measurement unit", which is in a form such that it can sense at least the accelerations along a first, a second and a third defined axis and at least the rates of rotation about this first, about this second and about the third defined axis, wherein the first defined axis corresponds to the longitudinal axis of the vehicle, the second defined axis corresponds to the transverse axis of the vehicle and the third defined axis corresponds to the vertical axis of the vehicle. These three axes form a Cartesian coordinate system, the vehicle coordinate system.

The sensor system has a strapdown algorithm unit 2 in which a strapdown algorithm is performed, said strapdown algorithm being used to process at least the sensor signals from the inertial sensor arrangement 1 to form corrected navigation data and/or driving dynamics data. These output data from the strapdown algorithm unit 2 comprise the data of the following physical variables:
the speed, the acceleration and the rate of rotation of the respective vehicle, for example in respect of the three axes of the vehicle coordinate system and, on the basis of the example, additionally in each case based on a world coordinate system that is suitable for describing the orientation and/or dynamic variables of the vehicle in the world. Moreover, the output data from the strapdown algorithm unit 2 includes the position in respect of the vehicle coordinate system and the orientation in relation to the world coordinate system. In addition, the output data from the strapdown algorithm unit have the variances as information about the data quality of the physical variables cited above, at least some of them. On the basis of the example, these variances are not calculated in the strapdown algorithm unit, but rather only used and forwarded by the latter.

The output data from the strapdown algorithm unit are, by way of example, moreover the output data or signals or output data 12 from the entire sensor system.

Moreover, the sensor system wheel speed sensor elements 3 for each wheel of the vehicle, on the basis of the example four, which each sense the wheel speeds of one of the wheels of the vehicle and each additionally sense the direction of rotation, and additionally a steering angle sensor element 3 that senses the steering angle of the vehicle. The wheel speed sensor element and the steering angle sensor element form a sensor arrangement 3 for sensing the odometry.

Furthermore, the sensor system has a satellite navigation system 4 that is in a form such that it senses and/or provides the distance data in each case between the associated satellite and the vehicle or a variable that is dependent thereon and also speed information data in each case between the associated satellite and the vehicle or a variable that is dependent thereon. In addition, the satellite navigation system 4, on the basis of the example, provides the fusion filter with a starting position or piece of starting position information, at least in order to start or switch on the sensor system.

Moreover, the signal processing device of the sensor system comprises a fusion filter 5. In the course of the collective evaluation of at least the sensor signals and/or signals derived therefrom from the sensor elements 3, that is to say the odometry, and of the output signals from the satellite navigation system 4 and/or signals derived therefrom, the fusion filter 5 provides a defined fusion data record 6. This fusion data record has respective data for defined physical variables, with the fusion data record 6 includes, for at least one physical variable, a value for this physical variable and a piece of information about the data quality thereof, this information about the data quality being embodied as a variance on the basis of the example.

The fusion data record 6 comprises a relative value, for example a correction value, also called an offset value, as a value for the at least one physical variable. On the basis of the example, the correction value is obtained in each case from the accumulated error values or change values that are provided by the fusion filter 5.

On the basis of the example, the relative values of the respective physical variables of the fusion data record 6 are thus correction values and variances. On the basis of the example, the fusion data record 6, in other words, calculates an error budget that is provided as an input variable or input data record for the strapdown algorithm unit and is at least to some extent taken into account by said strapdown algorithm unit during its calculations. This error budget includes, as a data record or output data, at least correction values or error values for physical variables and also in each case a variance, as a piece of information about the data quality, for each value. In this case, the fusion filter transmits to the strapdown algorithm unit at least the correction values and variances for the physical variables speed, acceleration and rate of rotation, in each case based on the vehicle coordinate system, that is to say in each case the three components of these variables in relation to this coordinate system, and also IMU orientation or the IMU orientation angle between the vehicle coordinate system and the coordinate system or the installation orientation of the inertial sensor arrangement 1 and also the position based on the world coordinate system.

The values of the physical variables of the fusion data record are calculated on the direct or indirect basis of the sensor signals from the sensor elements 3 and from the satellite navigation system 4, with at least some variables, for example the speed and the position of the vehicle in relation to the vehicle coordinates, being sensed and used in a redundant manner with respect to the data of the strapdown algorithm unit 2.

On the basis of the example, the fusion filter 5 is in the form of an error state space extended sequential Kalman filter, that is to say in the form of a Kalman filter that includes a linearization, in particular, and in which the correction values are calculated and/or estimated and that operates sequentially and in this case uses/takes into account the input data available in the respective function step of the sequence.

The fusion filter 5 is in a form such that in the course of a function step of the fusion filter always, asynchronously, the newest—available to the fusion filter—information and/ or signals and/or data from the sensor elements 3, that is to say from the wheel speed sensor elements and the steering angle sensor element indirectly by means of a vehicle model unit 7, and from the satellite navigation system 4 directly or indirectly, are sequentially updated and/or included in the fusion filter and are taken into account during the calculation of the associated function step of the fusion filter 5.

The vehicle model unit 7 is in a form such that it calculates, from the sensor signals from the wheel speed sensor elements 3 and from the steering angle sensor element 3, at least the speed along a first defined axis, the speed along a second defined axis and the rate of rotation about a third defined axis and provides them for the fusion filter 5.

On the basis of the example, the sensor system has four wheel speed sensor elements 3, wherein in each case one of the wheel speed sensor elements is associated with each wheel of the vehicle, wherein the vehicle model unit 7 is in a form such that, from the sensor signals from the wheel speed sensor elements and the steering angle, provided by the steering angle sensor unit, and/or the steering angle of each wheel, in particular sensed by the steering angle sensor element for the front wheels and by means of at least one further steering angle sensor element for the rear wheels or at least from a model assumption for the rear wheels, said vehicle model unit directly or indirectly calculates the speed components and/or the speed, of each wheel, along/in relation to the first and second defined axes, wherein, from these eight speed components and/or the four speeds in each case in relation to the first and second defined axes, the speed along a first defined axis, the speed along a second defined axis and the rate of rotation about a third defined axis are calculated.

The sensor system or the signal processing device thereof moreover an includes a tire parameter estimation unit 10 that is in a form such that it calculates at least the radius, on the basis of the example the dynamic radius, of each wheel and additionally calculates the cornering stiffness and the slip stiffness of each wheel and provides them for the vehicle model unit 7 as additional input variables, wherein the tire parameter estimation unit 10 is in a form such that it uses a substantially linear tire model for calculating the wheel/tire variables. The input variables of the tire parameter estimation unit on the basis of the example are in this case the wheel speeds 3 and the steering angle 3, at least to some extent or completely the output variables or values from the strapdown algorithm unit 2, particularly the variances provided thereby in addition to the values of the physical variables, and also the variances of the fusion filter 5, with respect to the physical variables that are the input variables for the tire parameter estimation unit 10.

The sensor system or the signal processing device thereof moreover comprises a GPS error recognition and plausibilization unit 11 that is in a form such that, on the basis of the example, it receives as input data the output data or output signals from the satellite navigation system 4 and also at least to some extent the output data or output signals from the strapdown algorithm unit 2 and takes them into account in its calculations.

In this case, the GPS error recognition and plausibilization unit 11 is additionally connected to the fusion filter 5 and interchanges data with the latter.

By way of example, the GPS error recognition and plausibilization unit 11 is in a form such that it carries out the following method:
method for selecting a satellite, includes:
measurement of measurement position data for the vehicle relative to the satellite on the basis of the GNSS signal, that is to say the global navigation satellite system signal, the output signal or the output data from the satellite navigation system 4,
determination of reference position data for the vehicle that are redundant with respect to the measurement position data determined on the basis of the GNSS signal; and
selection of the satellite if a comparison of the measurement position data and the reference position data satisfies a predetermined condition,
wherein a difference between the measurement position data and the reference position data is formed for the purpose of the comparison of the measurement position data and the reference position data,
wherein the predetermined condition is a maximum permissible error between the measurement position data and the reference position data,
wherein the maximum permissible error is dependent on a standard deviation that is calculated on the basis of a sum of a reference variance for the reference position data and a measurement variance for the measurement position data,
wherein the maximum permissible error corresponds to a multiple of the standard deviation such that a probability that the measurement position data are in a variation interval that is dependent on the standard deviation is below a predetermined threshold value.

The sensor system or the signal processing device thereof moreover has a standstill recognition unit 8 that is in a form such that it can recognize when the vehicle is at a standstill and, in the event of it having been recognized that the vehicle is at a standstill, provides at least the fusion filter 5 with information from a standstill model, in this case particularly the information that the rates of rotation about all three axes have the value zero and at least one position change variable likewise has the value zero and also particularly the speeds along all three axes have the value zero. On the basis of the example, the standstill recognition unit 8 is in this case in a form such that it uses the wheel speeds or wheel speed signals as input data, and also the "raw" or direct output signals from the inertial sensor arrangement 1.

On the basis of the example, the signal processing device calculates and/or uses a first group of data of physical variables whose values relate to a vehicle coordinate system and additionally calculates and/or uses a second group of data of physical variables whose values relate to a world coordinate system, wherein this world coordinate system is suitable particularly at least for describing the orientation and/or dynamic variables of the vehicle in the world, wherein the sensor system has an orientation model unit 9 that is used to calculate the orientation angle between the vehicle coordinate system and the world coordinate system.

The orientation angle between the vehicle coordinate system and the world coordinate system in the orientation model unit 9 is calculated at least on the basis of the following variables: the speed in relation to the vehicle coordinate system, the speed in relation to the world coordinate system and the steering angle.

On the basis of the example, the orientation angle between the vehicle coordinate system and the world coordinate system is calculated in the orientation model unit 9 additionally at least on the basis of one or more of the following variables: a piece of orientation information for the vehicle based on the world coordinate system, some or all of the correction values and/or variances of the fusion filter and/or the acceleration of the vehicle based on the vehicle coordinate system and/or the world coordinate system.

The orientation model unit 9 uses some or all of the output data and/or output signals from the strapdown algorithm unit 2 for calculation.

On the basis of the example, the orientation model unit 9 is in a form such that, in addition to the orientation angle, it also calculates and provides a piece of information about the data quality of this variable, particularly the variance of the orientation angle, wherein the orientation model unit 9 provides the orientation angle between the vehicle coordinate system and the world coordinate system and also the information about the data quality of this variable for the fusion filter 5, and the fusion filter uses this orientation angle in its calculations and particularly preferably forwards the information about the data quality of this variable, particularly the variance of the orientation angle, to the strapdown algorithm unit 2.

In this case, according to the example, the signal processing device of the sensor system is in a form such that it provides a piece of information about the consistency of at least one datum of a physical variable, wherein this datum of the physical variable is calculated at least to some extent, on the basis of the sensor signals from sensor elements that sense this physical variable directly or from the sensor signals from which it is possible to calculate this physical variable, wherein the information about the consistency of this datum of this physical variable is calculated at least on the basis of the directly or indirectly redundantly present sensor information.

In this case, according to the example, the signal processing unit is in a form such that it calculates and provides a relative confidence measure and, furthermore, an absolute confidence measure for the values of all the physical variables of the fusion data record.

Figure 2:
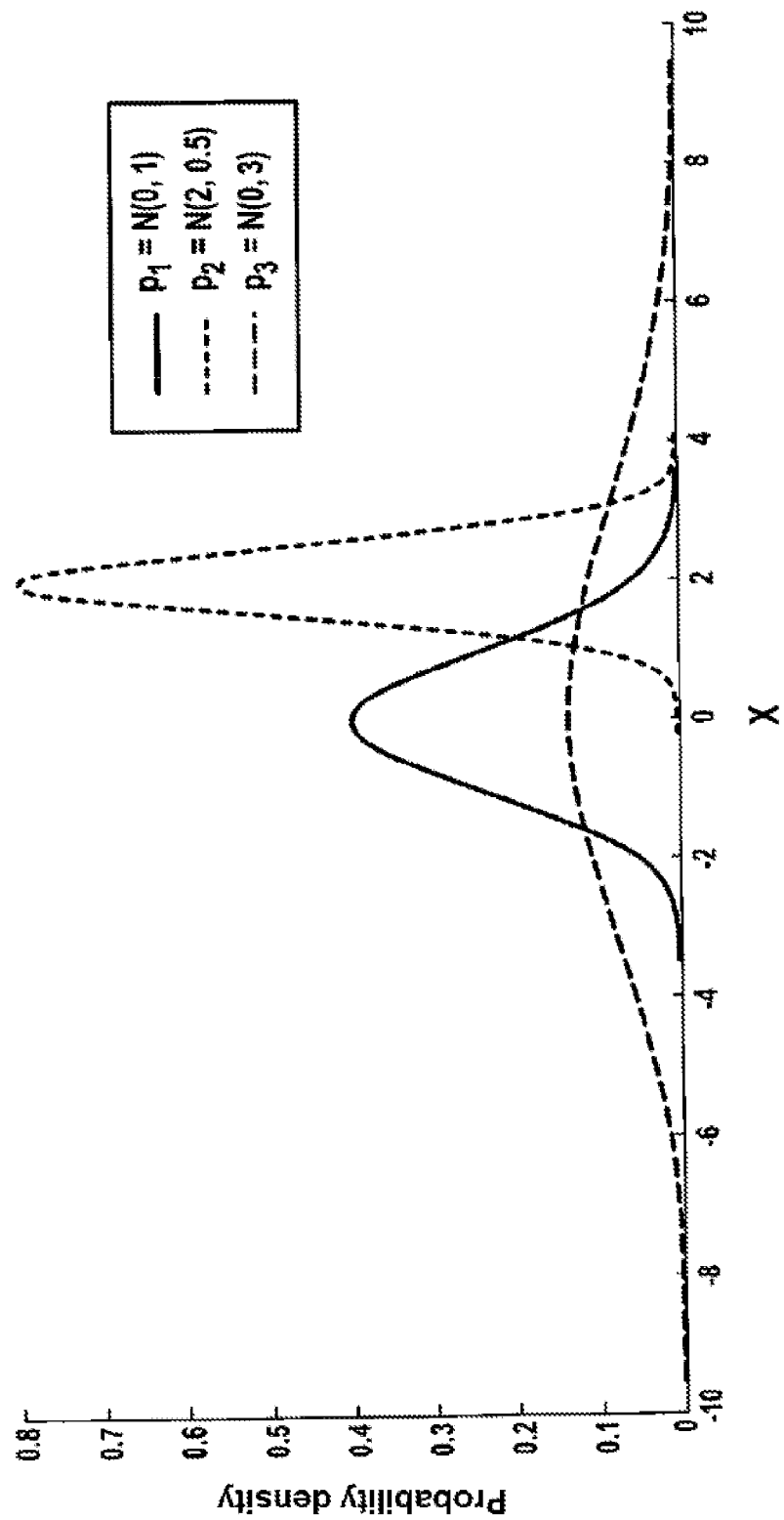
FIG. 2 is used for exemplary explanation pertaining to the calculation of confidence measures.

FIG. 2 schematically shows three exemplary probability densities. The expected value in this case corresponds to the measured value from the relevant sensor or sensor element in the measurement era under consideration, and the variation around this measured value corresponds to the specified uncertainty of the associated sensor. According to the example, the values have a normal distribution with:
$p_1 = N(0, 1)$ representing a sensor with average uncertainty
$p_2 = N(2, 0.5)$ representing a sensor with low uncertainty and deviation in the measured value from the other sensors
$p_3 = N(0, 3)$ representing a sensor with high uncertainty and without an offset in relation to $p_1$.

The results of the confidence calculations for various distributions are indicated by way of example in Table 1.

In comparison 1, it can be seen that by taking into account two measurements with different uncertainty, the match between the mean values maximizes the match extent, while the variation measure differs from the uncertainty of $p_1$ only to a small extent on account of the high uncertainty of $p_3$. In comparison 2, it is possible to see a decrease in $K_r$, since the offset in the mean values produces an inconsistency between $p_1$ and $p_2$. In comparison 3, this decrease is much smaller despite the same offset as in the case of comparison 2, since $p_3$ has a higher level of uncertainty than $p_2$. In comparison 4, the use of three probability densities makes the deviation from $p_2$ more clearly identifiable; this results in a decrease in $K_r$. In addition, it can be seen that the variation measure $K_a$ in comparisons 2 to 4 is significantly influenced by the low uncertainty of $p_2$.

TABLE 1

| No. | Compared probability densities | Match extent $K_r$ | Variation measure $K_a$ |
|---|---|---|---|
| 1 | $p_1 \cdot p_3$ | 1.0000 | 0.9487 |
| 2 | $p_1 \cdot p_2$ | 0.2019 | 0.4472 |
| 3 | $p_2 \cdot p_3$ | 0.8056 | 0.4932 |
| 4 | $p_1 \cdot p_2 \cdot p_3$ | 0.1757 | 0.4423 |

While the above description constitutes the preferred embodiment of the present invention, it will be appreciated that the invention is susceptible to modification, variation and change without departing from the proper scope and fair meaning of the accompanying claims.

The invention claimed is:

1. A sensor system arranged within a vehicle and comprising:
   a plurality of sensors including different sensors configured to sense different primary physical variables or use different measurement principles;
   wherein the plurality of sensors include at least two of the following different sensors:
      an inertial sensor configured to sense a first one of the different primary physical variables in the form of acceleration along a defined axis of the vehicle,
      a wheel speed sensor configured to sense a second one of the different primary physical variables in the form of a wheel speed of a wheel in a direction of rotation of the associated wheel of the vehicle,
      a steering angle sensor configured to sense a third one of the different primary physical variables in the form of a steering angle of the vehicle, or
      a satellite navigation system configured to sense or provide a fourth one of the different primary physical variables in the form of distance data between an associated satellite and the vehicle or a variable that is dependent on the distance data and also in the form of speed information between the associated satellite and the vehicle or a variable that is dependent on the speed information;
   a signal processing device comprising a fusion filter which is configured to evaluate sensor output signals from the sensors collectively and rate the information quality of the sensor output signals;
   wherein at least one datum of a physical variable is calculated, on the basis of the sensor output signals from the plurality of sensors that sense a selected one physical variable of the different primary physical variables directly or from the sensor output signals from which it is possible to calculate the selected one physical variable;
   the signal processing device further configured to provide a confidence information of the at least one datum of the physical variable;
   wherein the confidence information of the at least one datum of the physical variable is calculated at least on the basis of the directly or indirectly redundantly present sensor information; and
   wherein the signal processing device is configured to provide a first confidence measure as first confidence information, based on a degree of a match between the data or measured values and uncertainties thereof from at least two sensor output signals or data from the plurality of sensors weighted against one another on the basis of which the at least one datum of the physical variable is calculated, as the confidence information for the at least one datum of the physical variable;

wherein the degree of the match is for the same selected one physical variable that is determined from more than one of the different types of sensors.

2. The sensor system as claimed in claim 1, wherein the signal processing device has a fusion filter that provides a defined fusion data record in the course of the evaluation of at least the sensor signals or signals derived from the sensor elements, wherein the fusion data record includes at least one physical variable, a datum of the physical variable and a confidence information of the datum of the physical variable.

3. The sensor system as claimed in claim 1, wherein the signal processing device is configured such that the defined fusion data record additionally has at least one status datum of a sensor element which the sensor element provides itself by means of self-diagnosis, wherein the status datum is taken into account during the calculation of the confidence information of at least one datum of a physical variable.

4. The sensor system as claimed in claim 1, wherein the signal processing device is configured to use a physical value or a piece of measurement information or a value derived from a piece of measurement information and an uncertainty measure for a sensor output signal or data from of sensor of the plurality of sensors, respectively, for the sensor output signals or data from the plurality of sensors in order to calculate the first confidence information.

5. The sensor system as claimed in claim 1, wherein the signal processing device is configured such that for the at least one datum of a physical variable, defined as x, the associated first confidence information is calculated as the first confidence measure $K_r$ with $$K_r = \frac{\int_{-\infty}^{+\infty} \prod_{i=1}^{i=n} p_i(x, \mu_i, \sigma_i) \cdot dx}{\int_{-\infty}^{+\infty} \prod_{i=1}^{i=n} p_i(x, 0, \sigma_i) \cdot dx},$$

where $0 \leq K_r \leq 1$ and where n is defined or definable as the number of compared sensor output signals or data from the plurality of sensors, pi is defined or definable as the probability density function of the i-th sensor information source channel, and μi is defined or definable as the mean value of the probability distribution, and σi is defined or definable as the standard deviation of the probability distribution.

6. The sensor system as claimed in claim 1, wherein the signal processing device provides a second confidence measure as second confidence information, which is dependent on an uncertainty measure for at least two sensor output signals or data from the plurality of sensors on the basis of which the at least one datum of the physical variable is calculated, as the confidence information for the at least one datum of a physical variable.

7. The sensor system as claimed in claim 6, wherein the signal processing device is configured that for the at least one datum of a physical variable the associated second confidence information is calculated as the second confidence measure Ka with $$K_a = [\Sigma_{i=1}^{i=n} \sigma_i^{-2}]^{-1/2} \text{ or } K_a = \sqrt{\Sigma_{i=1}^{i=n} \sigma_i^2};$$

wherein n is the number of compared sensor output signals or data from the plurality of sensors and σi is the standard deviation of the i-th sensor information source channel.

8. The sensor system as claimed in claim 6, wherein a lack of a sensor output signals or data from the plurality of sensors is taken into account during the calculation of the confidence information of the at least one datum of a physical variable.

9. The sensor system as claimed in claim 8, wherein the signal processing device is configured such that, in response to the lack of a sensor output signals or data from the plurality of sensors being taken into account, no first confidence measure is calculated, and that in this case the value 0 is assumed for a second confidence measure, or a value close to infinity is assumed for the second confidence measure, or a defined value is assumed for the second confidence measure.

10. The sensor system as claimed in claim 6, wherein the first confidence measure is calculated based on weighting of the associated probability densities with one another by multiplication and integration of a result function.

11. The sensor system as claimed in claim 10, wherein the second confidence measure is calculated based on a summation of the variance for each sensor information source channel.

12. The sensor system as claimed in claim 1, wherein the signal processing device is configured such that for at least one datum of a physical variable a rating is performed to determine whether or not the confidence information is sufficiently great, wherein the rating is performed by calculating whether the first confidence information or the first confidence measure exceeds a defined threshold value.

* * * * *